US011537402B1

(12) United States Patent
Barrick et al.

(10) Patent No.: US 11,537,402 B1
(45) Date of Patent: Dec. 27, 2022

(54) EXECUTION ELISION OF INTERMEDIATE INSTRUCTION BY PROCESSOR

(71) Applicant: INTERNATIONAL BUSINESS MACHINES CORPORATION, Armonk, NY (US)

(72) Inventors: Brian D. Barrick, Pflugerville, TX (US); Bryan Lloyd, Austin, TX (US); Dung Q. Nguyen, Austin, TX (US); Brian W. Thompto, Austin, TX (US); Edmund Joseph Gieske, Cedar Park, TX (US); John B. Griswell, Jr., Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/305,734

(22) Filed: Jul. 14, 2021

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01); *G06F 9/30141* (2013.01); *G06F 9/30181* (2013.01)

(58) Field of Classification Search
CPC ............... G06F 9/3838; G06F 9/30043; G06F 9/30181–30196
See application file for complete search history.

(56) References Cited

U.S. PATENT DOCUMENTS

| 9,229,746 | B2 | 1/2016 | Indukuru et al. |
| 10,209,995 | B2 | 2/2019 | Chadha et al. |
| 10,417,002 | B2 | 9/2019 | Lloyd et al. |
| 2014/0379986 | A1* | 12/2014 | Troester .................... G06F 9/38 |
| | | | 711/132 |
| 2016/0117173 | A1* | 4/2016 | Chadha ................. G06F 9/3838 |
| | | | 712/206 |

(Continued)

OTHER PUBLICATIONS

Disclosed Anonymously, "A Method and System for Precise Prediction of OSC Hazards using Distance Comparison Between Store and Load Instructions," IP.Com Prior Art Database Technical Disclosure, IP.Com No. IPCOM000234987D, Feb. 21, 2014, 4 pgs.

(Continued)

*Primary Examiner* — William B Partridge
(74) *Attorney, Agent, or Firm* — Caleb D. Wilkes

(57) ABSTRACT

A method for operation of a processor core is provided. First instruction data is consulted to determine whether a second instruction has execution data that matches the first instruction data. The first instruction data is from a first instruction. In response to determining that the second instruction has execution data that matches the first instruction data, prior data is copied into the second instruction. The first instruction depends on the prior data. After receiving an availability indication of the prior data, both the first instruction and the second instruction are woken for execution, without requiring execution of the first instruction before waking of the second instruction. The second instruction is executed by using the prior data as a skip of the first instruction. A computer system and a processor core configured to operate according to the method are also disclosed herein.

20 Claims, 5 Drawing Sheets

(56) References Cited

U.S. PATENT DOCUMENTS

| | | | | |
|---|---|---|---|---|
| 2016/0117174 A1* | 4/2016 | Chadha | ............... | G06F 9/3838 |
| | | | | 712/206 |
| 2016/0179545 A1* | 6/2016 | Garifullin | ............ | G06F 9/3838 |
| | | | | 712/205 |
| 2017/0351522 A1* | 12/2017 | Ayub | ................... | G06F 9/3834 |
| 2020/0142702 A1* | 5/2020 | Fatehi | .................. | G06F 9/3838 |
| 2020/0301710 A1* | 9/2020 | Alexander | ........... | G06F 9/3836 |
| 2020/0341769 A1* | 10/2020 | Fatehi | .................. | G06F 9/3838 |
| 2020/0341771 A1* | 10/2020 | Fatehi | ................ | G06F 9/30036 |

OTHER PUBLICATIONS

Disclosed Anonymously, "Dependency Chain Prioritization to Speed Up Branch With Low-Confidence Prediction," IP.Com Prior Art Database Technical Disclosure, IP.Com No. IPCOM000247282D, Aug. 18, 2016, 5 pgs.

IBM, "Method of Avoiding Memory Ambiguity Flushes in a Microprocessor Using a Memory Dependency Table," IP.Com Prior Art Database Technical Disclosure, IP.Com No. IPCOM000182613D, May 4, 2009, 3 pgs.

Reinman, et al., "Classifying Load and Store Instructions for Memory Renaming," Published in the Proceedings of the International Conference on Supercomputing, Jun. 1999, 10 pgs.

Park et al., "Reducing Design Complexity of the Load/Store Queue", Proceedings of the 36th Annual IEEE/ACM International Symposium on Microarchitecture (MICRO-36 2003), Dec. 2003, 12 pgs.

Yoaz et al., "Speculation Techniques For Improving Load Related Instruction Scheduling", ISCA '99: Proceedings of the 26th annual international symposium on Computer architecture, May 1999, pp. 42-53.

* cited by examiner

US 11,537,402 B1

EXECUTION ELISION OF INTERMEDIATE INSTRUCTION BY PROCESSOR

BACKGROUND

The present invention relates generally to processors that are used in computer systems and that read and execute software code that is input into the processors.

SUMMARY

According to one exemplary embodiment, a method for operation of a processor core is provided. First instruction data is consulted to determine whether a second instruction has execution data that matches the first instruction data. The first instruction data is from a first instruction. In response to determining that the second instruction has execution data that matches the first instruction data, prior data is copied into the second instruction. The first instruction depends on the prior data. After receiving an availability indication of the prior data, both the first instruction and the second instruction are woken for execution, without requiring execution of the first instruction before waking of the second instruction. The second instruction is executed by using the prior data as a skip of the first instruction. A computer system and a processor core configured to operate according to the method described above are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
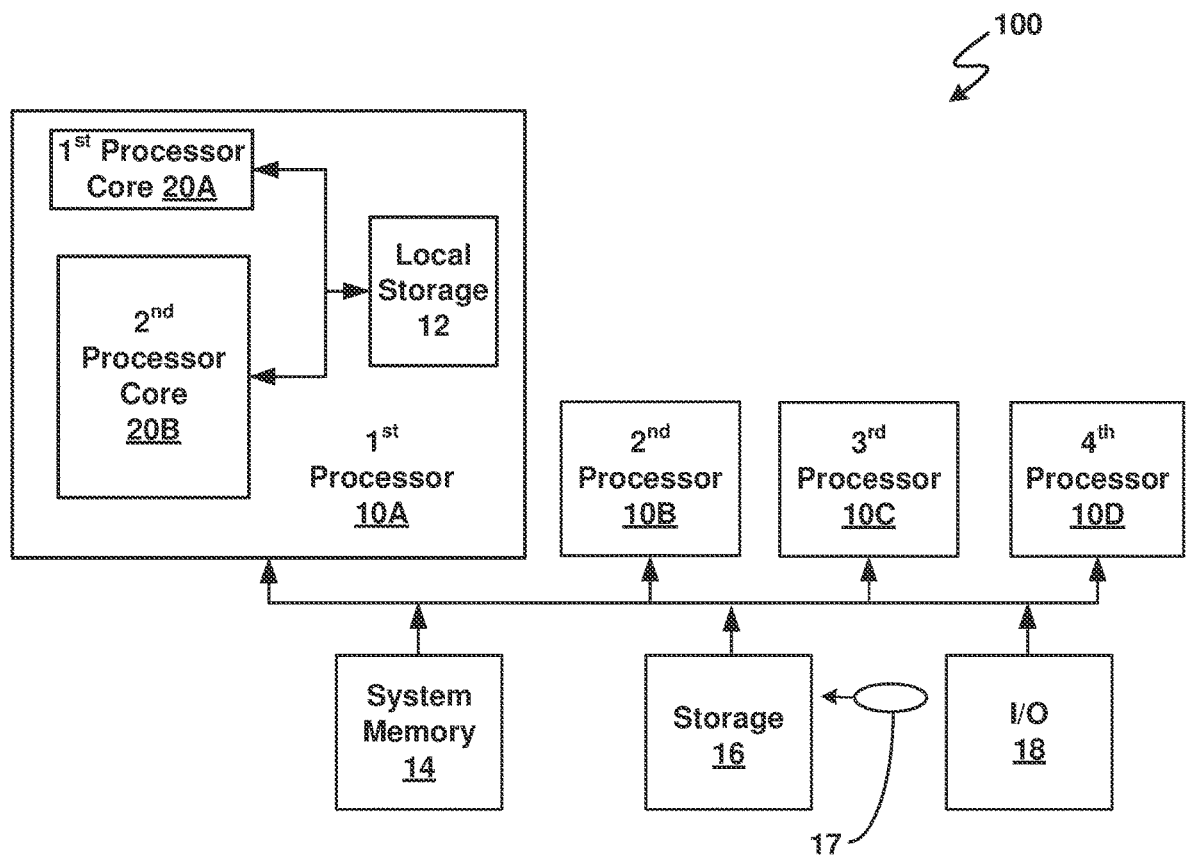
FIG. 1 is a block diagram illustrating a processing system in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a processor, a computer system, and a method for operation of a processor which reduce dependency chains for some instructions so that performance of instruction code and software code may be performed more quickly by the processor. The described embodiments enable bypasses so that a subsequent instruction that depends on an earlier instruction may be executed without having to wait for the earlier instruction to execute. Thus, a computer system with the improved processor more quickly executes and performs instructions of software code.

In some instances when a processor processes instruction code that includes a second instruction depending on an earlier first instruction, the second instruction must wait for the earlier first instruction to execute before the second instruction can execute. This required waiting introduces delay into the propagation of instruction execution. The described embodiments may help avoid delays that result when instruction flushing or issue delays have been used to solve out-of-order or dependent instruction problems. The described embodiments may perform execution elision of an intermediate instruction, e.g., a store instruction, in order to reduce dependencies and to speed processing times. The described embodiments may improve processing performance and processing speed for out-of-order processors.

Some instruction sequences that are to be executed by a processor cause the processor to delay because some data are not initially available for use and only become available after execution of prior instructions in a sequence. Multiple instructions may be coded to write to the same location or to retrieve data from the same location or address, which traditionally may have caused processing delays because an earlier instruction would need to be executed before the later instruction could execute.

For example, the following three-instruction sequence provided below includes instructions I0, I1, and I2, with I0 being the oldest instruction and the I1 instruction being older than the I2 instruction.

I0 ADD GPR5, GPR10, GPR11
I1 STORE GPR5, GPR6, GPR7
I2 LOAD GPR8, GPR6, GPR7

The add instruction I0 adds at location GPR5 the values from locations GPR10 and GPR11. The store instruction I1 stores data from the GPR5 position into a memory location with an address that is generated by adding the values at locations GPR6 and GPR7. The load instruction I2 loads, to the GPR8 location, data from the address generated by adding the values at locations GPR6 and GPR7. In this specific example, all of the GPRs are logical registers where contents are held in the register file.

Because (1) the store instruction I1 affects the value at the memory location with an address generated by adding the values at locations GPR6 and GPR7 and (2) for a sequential execution of the instructions the store instruction I1 should be performed before the load instruction I2 is performed, the load instruction I2 is dependent on the store instruction I1. The load instruction I2 has typically needed the store instruction I1 to be issued from the issue queue before the load instruction I2 could have the updated value to perform a loading action that loads the correct value. With the issuing from the issue queue, the store reorder queue would contain the data and would be able to supply the data to a store forwarding mux. The wait for this value has caused processing delays. Moreover, if a dependent instruction issues without waiting for its precursor instruction to execute then a need for flushing is generated because the dependent instruction may have been filled with data that later was learned to be outdated or stale data. Instruction flushing included removing the instruction that was filled with outdated data so that the filling of the instruction may be repeated but with the correct updated value. This flushing also is time consuming. The store instruction I1 also waits for the add instruction I0 to produce the result for GPR5 before the store is issued and executed.

The present embodiments help overcome this delay at the last instruction in this sequence. For the above three-instruction sequence scenario I0-I1-I2, the present embodiments may respond by waking up both the store instruction I1 and the load instruction I2 simultaneously when the add instruction I0 produces a result and gives that result as a value into the GPR5 location. With the present embodiments, the load instruction will be able to skip the store instruction and be able to issue and execute without waiting for the store to execute and store data and without waiting for the store to issue from the issue queue. With the present embodiments, the dependent load instruction may be issued from the issue queue before the store instruction is issued from the issue queue. This skipping or register skipping will increase performance significantly.

With the present embodiments, the load instruction I2 may wait for the add instruction I0 to produce the result for GPR5 before the load instruction I2 can be issued and executed. The store instruction I1 will also need to wait for the add instruction I0 to execute and provide the store data. The load instruction, however, will not have to wait for the store data stored by the store instruction I1 to be available before issuing. The load instruction and the store instruction here may both depend on the add instruction. The load instruction indirectly depends on the add instruction through the dependency on the store data, but via the skipping may be modified to directly depend on the add instruction. Thus, after the data update for skipping a middle instruction, e.g., the store instruction, a late instruction, e.g., the load instruction, may directly depend on another source, e.g., an early instruction, e.g., the add instruction. The other source may in some instances constitute a fixed point instruction. The other source may alternatively be a prior producer. The intermediate and late instructions may depend on the prior producer.

After this copying of the earlier or prior data into the late instruction, an availability indication of the earlier data may wake both the middle instruction and the late instruction so that these two later instructions may be issued in parallel or may execute in parallel. This waking of both the middle and late instruction may occur simultaneously, but in any event without requiring execution of the first instruction before waking of the second instruction. The earlier data may relate to a value to be processed and/or to a location where the processing will occur. When the earlier or prior data is from a prior instruction, execution of the prior instruction may generate an availability indication that may cause both the middle and the late instruction to be woken.

Figure 2A:
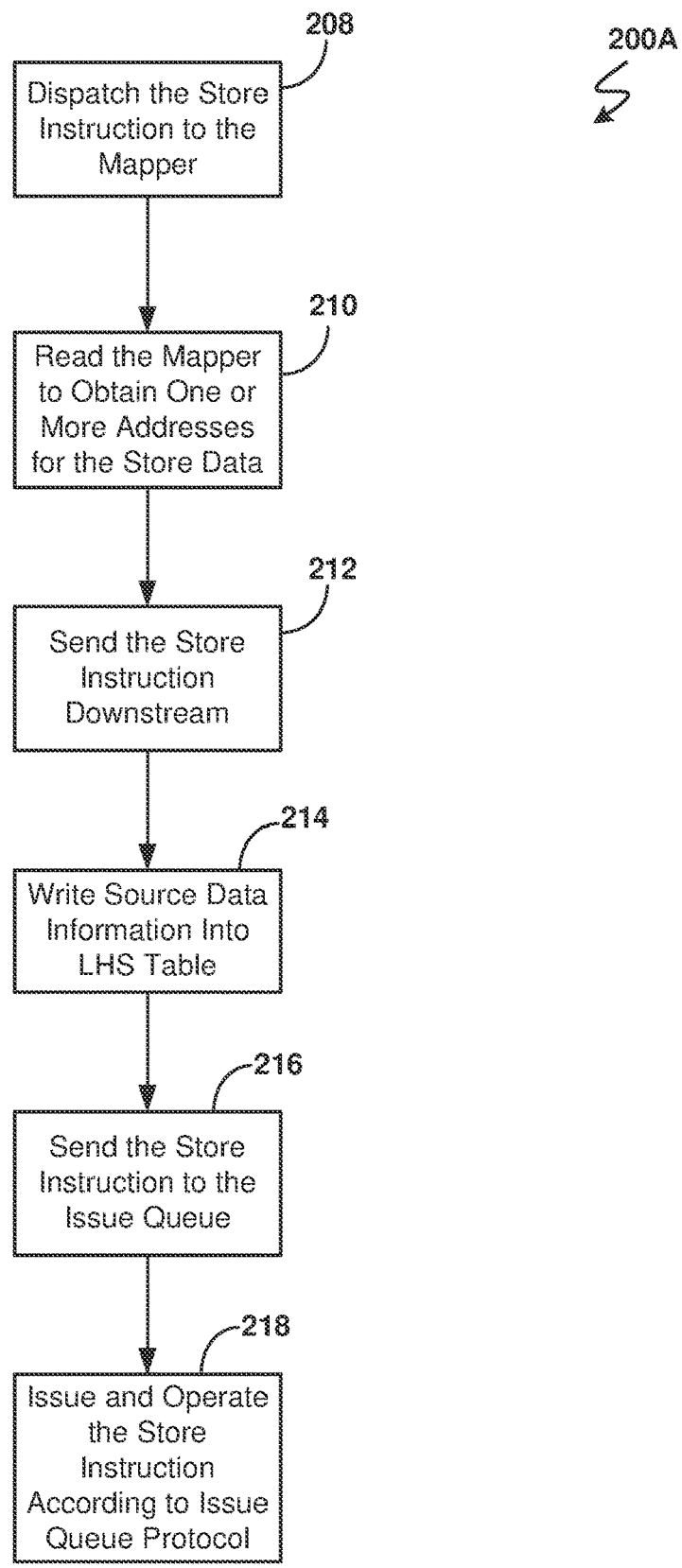
FIG. 2A is an operational flowchart illustrating a store instruction flow path for an instruction dependency reduction process according to at least one embodiment.
Figure 2B:
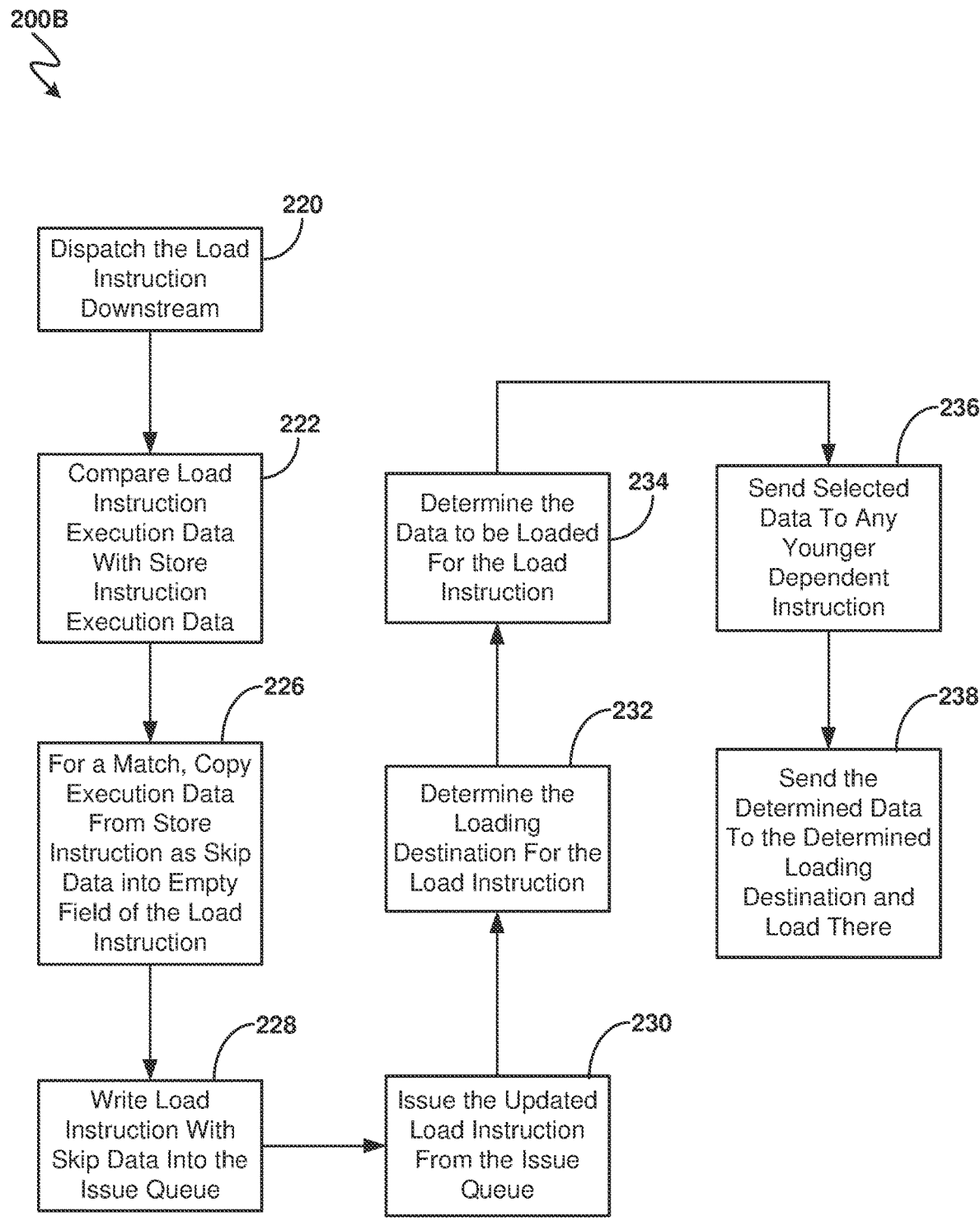
FIG. 2B is an operational flowchart illustrating a load instruction flow path for an instruction dependency reduction process according to the at least one embodiment.

Referring now to FIG. 1, a processing system 100 in accordance with an embodiment of the present invention is shown. The processing system 100 that is depicted includes a number of processors including a first processor 10A, a second processor 10B, a third processor 10C, and a fourth processor 10D. Each of the first processor 10A, the second processor 10B, the third processor 10C, and the fourth processor 10D may be designed and have components in conformity with one or more of the present embodiments, for example may be designed and have components in conformity with the dependency-reducing processor core 32 shown in FIG. 3 and that are configured to perform the dependency-reducing processor operation process that is shown in FIGS. 2A and 2B. The processing system 100 that is depicted with multiple processors is illustrative. Other processing systems in accordance with other embodiments may include a single processor having symmetric multi-threading (SMT) cores. The first processor 10A includes a first processor core 20A, a second processor core 20B, and a local storage 12, which may be a cache level, or a level of internal system memory. The second processor 10B, the third processor 10C, and the fourth processor 10D may have similar internal components or the same design of internal components as the first processor 10A. The first processor 10A, the second processor 10B, the third processor 10C, and the fourth processor 10D are coupled to a main system memory 14 and to a storage subsystem 16, which includes non-removable drives and optical drives, for reading a first portable computer-readable tangible storage device 17. The processing system 100 also includes input/output (I/O) interfaces and devices 18 such as mice and keyboards for receiving user input and graphical displays for displaying information.

While the system of FIG. 1 is used to provide an illustration of a system in which the processor architecture of the present embodiments is implemented, it is understood that the depicted system is not limiting and is intended to provide an example of a suitable computer system in which the techniques of the present embodiments are applied. It should be appreciated that FIG. 1 does not imply any limitations with regard to the environments in which different embodiments may be implemented. Many modifications to the depicted environment may be made based on design and implementation requirements.

As will be discussed with reference to FIG. 4, the processing system 100 may also include internal components 902a and external components 904a, respectively. The processing system 100 may be, for example, a mobile device, a telephone, a personal digital assistant, a netbook, a laptop computer, a tablet computer, a desktop computer, or any type of computing device capable of running a program, accessing a network, and accessing a database in a server that is remotely located with respect to the processing system 100.

Figure 3:
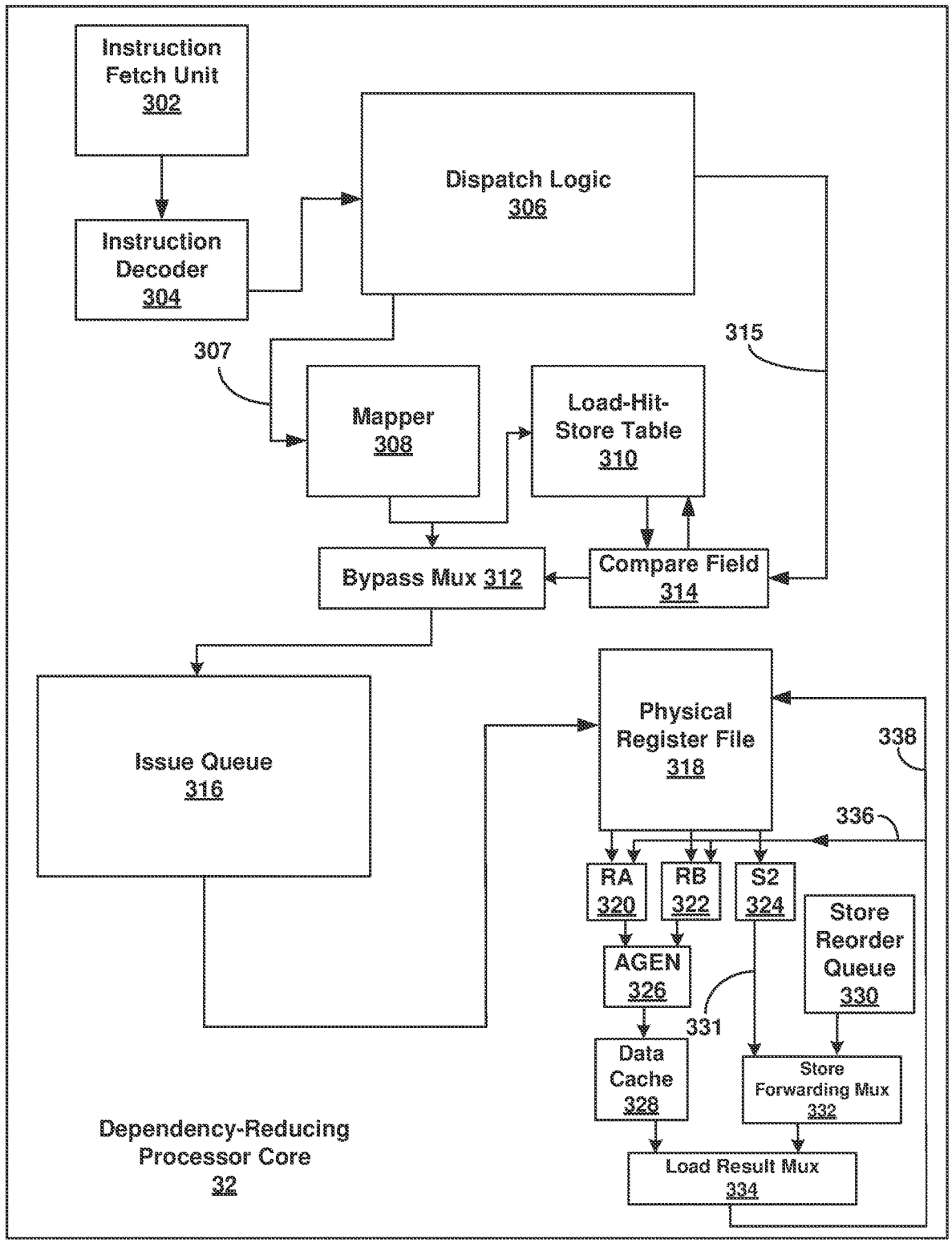
FIG. 3 is a block diagram illustrating portions of a processor core in accordance with at least one embodiment.

Operational flowcharts depict a dependency-reducing processor operation process that is divided into store instruction flow process 200A shown in FIG. 2A and load instruction flow process 200B shown in FIG. 2B. This dependency-reducing processor operation process including the store instruction flow process 200A shown in FIG. 2A and load instruction flow process 200B shown in FIG. 2B, according to at least one embodiment, may be performed by the dependency-reducing processor core 32 that is shown in FIG. 3. FIG. 3 will be described along with FIGS. 2A and 2B and shows the dependency-reducing processor core 32 that is an example of a processor core that is configured to reduce instruction dependencies to improve processor speed and processor performance according to the present embodiments. The dependency-reducing processor core 32 may include hardware facilities that include one or more execution units and a physical register file. The execution units may be used to perform the described dependency-reducing processor operation process. The one or more execution units may be used to execute instructions. The physical register file holds contents of the architected register values.

As a precursor to the shown steps, instructions are fetched from the software code that is to be ran by the processor. This instruction fetching may be performed by an instruction fetch unit 302 shown in FIG. 3 which fetches one or more instruction streams from cache or system memory. The instructions may be fetched from a program counter which may be a special register that holds the memory address of the next instruction to be executed. The instruction fetch unit 302 may send a read command along a bus which connects to system memory, e.g., system memory 14 shown in FIG. 1. In response to a read command, the system memory 14 may via the bus send to the dependency-reducing processor core 32 information corresponding to the read command. The instruction fetch unit 302 may copy this information that may include the instructions and instruction streams. The instructions that are fetched may include store instructions, load instructions, and other instructions such as add instructions, fixed-point instructions, and floating point instructions.

The instruction fetch unit 302 may check every cycle if any more code is available to fetch. Fetching new instructions may occur without waiting for execution of a prior instruction. The instruction fetch unit 302 may fetch continuously unless there are no more instructions to fetch or unless the instruction fetch unit 302 stalls. For example, the instruction fetch unit 302 may stall if the processor core is full and cannot handle any new instruction.

In another precursor step, the fetched instructions are decoded. This instruction decoding may be performed by an instruction decoder 304 shown in FIG. 3 which decodes one or more instruction streams so that the instruction streams may be read, identified, and subsequently performed and executed by the dependency-reducing processor core 32. The decoding may include determining what instructions and arguments are represented by opcode in the fetched instructions. The decoding allows the processor to identify what operands will be needed to perform the instruction. The decoding may include breaking down and translating macro-level instructions into units suitable for micro-operations. The instructions to be decoded may be sent in binary code.

In another precursor step of the dependency-reducing processor operation process, a determination is made regarding the instruction type of a decoded instruction. For example, a determination may be made whether the instruction is a store instruction or a load instruction. This determination may be made to the instructions that were previously fetched and then decoded. The determination of instruction type may be made by the instruction decoder 304 or by the dispatch logic 306. The decoded instruction reveals its type, e.g., whether it is a load instruction or a store instruction. Load instructions move data from memory to registers. Store instructions move data from registers to memory. The decoded instructions may include symbols such as "lw" or "stw" which indicate whether an instruction is a load instruction or a store instruction. If the determination is that the decoded instruction is a store instruction, the store instruction flow process 200A shown in FIG. 2A may proceed. The store instruction may proceed down a store instruction path 307 shown in FIG. 3. If the determination is that the decoded instruction is a load instruction, the load instruction flow process 200B shown in FIG. 2B may proceed. The load instruction may proceed down a load instruction path 315 shown in FIG. 3.

The store instruction may be considered a first instruction as compared to a load instruction which follows the store instruction in an instruction sequence. The load instruction which comes later in the sequence may be referred to as a second instruction. An instruction in the sequence prior to both the load instruction and the store instruction may be referred to as a prior instruction.

In a step 208 of the store instruction flow process 200A of the dependency-reducing processor operation process, the store instruction is sent to the mapper. FIG. 3 shows a mapper 308 that may receive instructions such as a store instruction from the dispatch logic 306. The transmission of an instruction may occur as an intra-processor transmission. The mapper 308 may be part of a logic portion of the processor. The mapper may allocate storage in various register sets so that concurrent execution of program code can be supported by various pipelines. The mapper 308 may map programmer instructions, such as logical register names, to physical resources of the processor, such as physical register addresses. The mapper 308 may include one or more of a condition register (CR) mapper, a link/count (LNK/CNT) register mapper, an integer exception register (XER) mapper, and a floating point status and control register (FPSCR) mapper. Other register types may be used depending on the architecture of the processor core. The dispatch logic 306 may perform the step 208. The mapper 308 provides logical to physical mapping.

The mapper 308 uses the "GPR" terminology, e.g., GPR5, GPR6, GPR7, etc., as part of physical-to-logical mapping. The GPR terminology provides logical registers which refer to specific locations in the physical register file. After the mapper 308, during the process the physical register file addresses corresponding to the logical registers are used, e.g., 0x005 may be used instead of GPR5. However, any reference to a GPR location in the present disclosure may be referring as an informal reference to the physical register location, e.g., to the 0x005 location.

The dispatch logic 306 may stall a dispatch of an instruction if one or both of the mapper 308 and an issue queue are full. The dispatch logic 306 may hold the instruction until an opening in the issue queue and/or the mapper 308 is indicated, so that the mapper 308 and the issue queue have room to receive a new instruction.

In a step 210 of the store instruction flow process 200A of the dependency-reducing processor operation process, the mapper 308 is read to obtain an address for the store data. This store data may be the data that is to be stored via execution of the store instruction. The address may include a register file tag, pointer into the physical register file, or location within the register file where the store data is currently residing. This location may be a logical register where a previous instruction wrote the data. Data contents are stored within the physical register file within the processor core. FIG. 3 shows a physical register file 318 where all the logical registers are stored in a physical location. In the above example with store instruction I1, the store instruction I1 will read the mapper 308 to receive the pointer to the GPR5 location in the physical register file 318. A unique mapper entry may be used for each logical register in the processor. For instances when the store instruction depends on a previous instruction, the store instruction will read information from the previous instruction and store this information. The store instruction may obtain from the mapper 308 both an instruction tag, e.g., an ITAG, of the previous instruction and W bits of the previous instruction. This obtained information may be passed over to the issue queue to assist in the issuing of the store instruction as will be described subsequently.

Table 1 below shows an example of a table that shows some data organized by the mapper 308.

TABLE 1

Mapper Information

| Physical Register File (PRF) Tag | ITAG | W bit |
|---|---|---|
|  |  |  |

The ITAG is an instruction tag that facilitates tracking of the instruction. The processor assigns a tag for every instruction that comes down, so that the instruction may be tracked. An ITAG tracks an instruction from decode to completion. The ITAG may be implemented as a set of binary bits.

W bits are written bits which indicate in a binary manner whether the data is ready or is available. The W bits may be provided in a form indicating yes/no, affirmative/negative, etc. If the W bit is positive, the system places less concern on the ITAG, because the data is already there and which elements provided the data becomes less relevant. If the W bit is negative, the ITAG indicates for which elements the processing is waiting before the instruction may be executed. The W bit may be referred to as a data-availability written bit.

For the I0-I1-I2 three instruction sequence described above, the store instruction I1 may arrive at the mapper 308 with the store destination of GPR6+GPR7 and with the retrieval location GPR5. At this retrieval location GPR5, the store instruction I1 will subsequently obtain the information/data that will be stored at the store destination. Thus, the store instruction I1 may scan the mapper 308 for any GPR5, GPR6, or GPR7 entry in the mapper 308. The store instruction I1 may find no outstanding dependency in the mapper 308 for GPR6 and no outstanding dependency in the mapper for GPR7, but reading the mapper 308 may reveal for the store instruction I1 that the GPR5 depends on the add instruction I0. The execution of the add instruction I0 will write into the GPR5 location the value from GPR10+GPR11. Because of the hit for GPR5, the store instruction I1 here at the mapper 308 will read the instruction tag and the W-bit that are associated with GPR5. In this example, the GPR5 and the W bit for same may be referred to as prior data that is used to store the result of the add instruction I0. Prior data may also refer to data that is produced by the add instruction I0.

The store instruction I1 will take the instruction tag and the W-bit from the add instruction I0 as the store instruction I1 leaves the mapper 308. The W-bit for the add instruction I0 is a binary that indicates whether the add instruction I0 has produced its result. This add instruction w-bit at this point for this embodiment may indicate "No". The "No" means that the GPR5 location has not yet received an updated value from performance of the add instruction I0.

The store instruction maintains at this point of the store instruction flow process 200A the store destination of GPR6+GPR7.

For a store instruction such as the store instruction I1, the terminology of a "store destination" may refer to the location in memory where data or information will be stored as part of performing the storing that occurs with execution of the store instruction. The terminology of a "retrieval location" for a store instruction such as the store instruction I1 may refer to a location where the store instruction retrieves data or information that the store instruction will subsequently store at the store destination as part of performing the storing that occurs with execution of the store instruction. The retrieval location may hold the storage data that is retrieved for storage. The retrieval location may be from within the physical register file 318.

In a step 212 of the store instruction flow process 200A of the dependency-reducing processor operation process, the store instruction is sent downstream. The store instruction may proceed past the mapper 308 and may continue to the load-hit-store table 310, to the bypass mux 312, and/or to the compare field 314. This transmission occurs within the dependency-reducing processor core 32 and may occur within different logic portions within the dependency-reducing processor core 32.

Entries in the load-hit-store table 310 may contain an address field, such as the immediate field, a first register, a second register, a physical register file memory location, i.e., a physical register tag where instruction data may be found, the instruction tag, and the W bit for an instruction. The load-hit-store table 310 may hold the physical register tag for the store data that the store instruction will write to memory. The RS is the store data and the RS value may be provided to a later instruction that depends on the store instruction as a load-hit-store dependency. The load-hit-store table 310 may also include a type field which indicates which of the registers and the immediate field are used to generate the memory address for the store instruction. Other load-hit-store tables with load-hit-store logic have been implemented in processors to avoid or reduce instruction flushing when instructions are performed out-of-order so that an instruction processes outdated data instead of most recent data. The load-hit-store table 310 may be considered to be within the dispatch logic of the dispatch logic 306 or may be its own independent entity within the dependency-reducing processor core 32.

Table 2 below shows an example of a table that may in some embodiments be or be part of the load-hit-store table 310.

TABLE 2

Load-Hit-Store Table 310

| RS PFR-tag | ITAG | W | RA | RB | immediate |
|---|---|---|---|---|---|
|  |  |  |  |  |  |

The compare field 314 represents a region where data for multiple instructions, e.g., two instructions, may be compared outside of the load-hit-store table 310. Such comparison in the compare field 314 may be useful when two instructions are sent from the dispatch logic 306 at the same time or close in time and which results in a first of these two instructions, e.g., an earlier instruction, has not yet completed being recorded into the load-hit-store table 310 when the second of these two instructions arrives at the load-hit-store table 310 for comparison. If the store instruction I1 is dispatched by the dispatch logic 306 at the same time that the load instruction I2 is dispatched by the dispatch logic 306, when the load instruction I2 arrives by the load-hit-store table 310 the store instruction I1 may not have yet had its information written into the load-hit-store table 310. In that scenario, the store instruction I1 may be compared to the load instruction I2 in the compare field 314.

In a step 214 of the store instruction flow process 200A of the dependency-reducing processor operation process, source instruction information is written into the load-hit-store table 310. The source instruction information may be from the store instruction that was sent downstream in step 212. The source data information that is written in step 214 may include an address field, such as the immediate field, a first register, and/or a second register, a physical register file field which holds a pointer to a data value that a store instruction will write out to memory, the ITAG, and/or a W bit for an instruction. The ITAG and the W bit may be for the instruction that produces the store data value, which in the above I0-I1-I2 example is the add instruction I0. The load-hit-store table 310 may hold the physical register tag for the store data that the store instruction will write to memory. For store instructions that depend on a previous instruction, the ITAG and W bit information that are written into the load-hit-store table 310 may be those from the previous instruction. The registers may be referred to as register operands as they may be used to generate an address involved in an instruction. The registers may also be written into the load-hit-store table 310 associated with the particular instruction. The load-hit-store table 310 may perform a write operation to enter in this information from received store instruction. The load-hit-store table 310 may be disposed close to the dispatch logic 306 within the processor.

In the I0-I1-I2 three instruction sequence described above, the store instruction I1 may write into the load-hit-store table 310 the instruction tag for the instruction that produces the GPR10+GPR11 value and the w-bit at this point is a binary that indicates "No". The store instruction I1 may also write into the load-hit-store table GPR6 for "RA" and GPR7 for "RB". The store instruction I1 may also write as a PFR tag "GPR5", because "GPR5" represents the retrieval location in the physical register file 318 for the store instruction I1.

In at least some instances it is possible that the store instruction I1 is dispatched by the dispatch logic 306 before a load instruction is dispatched by the dispatch logic 306, so that the store instruction I1 has written the information in step 214 into the load-hit-store table 310 by the time the load instruction arrives at the load-hit-store table 310.

In a step 216 of the store instruction flow process 200A of the dependency-reducing processor operation process, the store instruction is sent to the issue queue. The dependency-reducing processor core 32 shown in FIG. 3 includes an issue queue 316 and may in other embodiments include multiple issue queues. The issue queue 316 may control issuance of both store instructions and load instructions. The issue queue 316 may receive from an instruction all the sources that are required for the instruction to be executed. The issue queue 316 may receive the W bits for an instruction which indicate if the needed data has been written and is available for use in the instruction execution. Some instructions may include additional dependencies, such as if an instruction is to execute to an execution unit that cannot run a pipeline. In some instances, an instruction or a pipeline must be finished before execution of the next instruction may commence. If all information and sources for an instruction are ready, the issue queue 316 may issue, according to a sequential order of receiving the instructions (first-come, first-serve basis), this instruction so that this instruction is executed.

In a step 218 of the store instruction flow process 200A of the dependency-reducing processor operation process, the store instruction is issued and operated according to issue queue protocol. A store instruction may operate by storing store data residing in the physical register file 318 out to a memory location. The operation of the store instruction may include performing an operand or calculation to determine a correct memory location for storing data or for determining what value is to be stored.

In the above-described three-instruction sequence I0-I1-I2, after or upon execution of the add instruction, the store instruction may be woken for execution by issuing the store instruction from the issue queue 316. When the store instruction includes prior data from a prior instruction, then the store instruction may use the prior data for the execution. For example, the store instruction I1 may include a value from GPR5 that was placed there by the add instruction I0. The add instruction I0 placed the value from the combination of GPR10+GPR11 into the GPR5 physical register file address. The store instruction I1 uses the value in GPR5 and stores that value at the specified address that was generated from a combination of values of GPR6+GPR7. This GPR5 value is contained in the physical register file 318 and is data that is to be written to memory as part of the execution of the store instruction I1. Such storage data in general may have been written by any type of instruction. An availability indication may be generated when the prior data is available, e.g., when the add instruction I0 is finished. After or upon receiving this availability indication, the issue queue 316 may then wake, activate, and issue the store instruction I1 so that this store instruction I1 may be executed/performed.

The path for operation of the store instruction after issuance of the store instruction from the issue queue 316 is not illustrated in FIG. 3, although the store instruction may proceed through some of the components or logic areas illustrated in FIG. 3. The store instruction I1 may read from the physical register file 318 the values of GPR6 and GPR7 and feed those to the AGEN 326 to determine the store destination. The AGEN 326 may add the values of GPR6 and GPR7 to determine the store destination. The store instruction I1 may also read from GPR5 in the physical register file 318 the value that is to be stored in the store destination.

The store instruction may proceed through a load store unit (LSU) and to the store reorder queue 330. A store instruction may proceed to the data cache 328 and out to memory. The store instruction may sit inside the store reorder queue 330 with the generated address and data until its turn in the proper sequence begins.

For the load instruction flow process 200B shown in FIG. 2B of the dependency-reducing processor operation process, the fetch and decode steps described above may also be performed as precursor steps. When a determination is made that a decoded step is a load instruction, the load instruction flow process 200B may proceed in the dependency-reducing processor core 32. The store instruction may flow in the store instruction flow process 200A concurrently while the load instruction flows down the load instruction flow process 200B or before the load instruction flows down the load instruction flow process 200B. The load instruction may include load instruction data. Load instruction data may include a retrieval location for retrieving the data that will be loaded during the loading. The load instruction data may include operands or registers which are used to determine a retrieval location. The retrieval location for a load instruction may be the memory address where data will be obtained that will be written into a logical register, i.e., loaded into the logical register, for execution of the load instruction. Load instruction data may also indicate a destination location for the destination where the data will be loaded during the loading. The destination location for a load instruction may include the logical register in which the data retrieved from memory will be written.

In the step 220 of the load instruction flow process 200B of the dependency-reducing processor operation process, the load instruction is dispatched downstream. The dispatch logic 306 may perform this dispatch of the load instruction. The load instruction may proceed down a load instruction path 315 shown in FIG. 3 and may advance to the compare field 314 and/or to the load-hit-store table 310. The compare field 314 as described above represents a region where data for multiple instructions, e.g., two instructions, may be compared outside of the load-hit-store table 310. Such comparison in the compare field 314 may be useful when two instructions are sent from the dispatch logic 306 at the same time or close in time so that a first instruction, e.g., an earlier store instruction, has not yet been recorded into the load-hit-store table 310 when the second instruction arrives at the load-hit-store table 310 for comparison. The load-hit-store table 310 was described above with respect to the store instruction flow process 200A. Without this comparison field 314 the second instruction might miss recognition of this first instruction, because a scan of the load-hit-store table 310 at this time may not yet reveal the system presence of the first instruction.

In practice, although not shown in FIG. 3 all instructions including the load instructions will do a lookup at the mapper 308 to identify the physical register file tag to use for the logical register tag that is provided from the instruction. For example, the instruction may look into the mapper 308 to find the location of GPR6 and GPR7 in the physical register file 318. In contrast to a store instruction which writes into the load-hit-store table 310, the load instruction will compare against values in the load-hit-store table 310.

In the step 222 of the load instruction flow process 200B of the dependency-reducing processor operation process, load instruction execution data is compared with store instruction data. The load instruction address information may be compared with prior store address information to determine if both will access the same memory location. This comparison may be performed in the load-hit-store table 310 or in the compare field 314 outside of the load-hit-store table 310. The execution data may include a data retrieval location. For a load instruction in general, a data retrieval location may be a memory location that holds the data that will be retrieved and then loaded during execution of the load instruction. For the load instruction I2 in the above I0-I1-I2 example, the data retrieval location may be the location in the physical register file 318 that holds the data that will be retrieved and then loaded during execution of the load instruction I2.

The comparison may be of the first source S0, the second source S1, and the immediate field of the load instruction to either the first source S0, the second source S1, and the immediate field of the store instruction in the compare field 314 or to entries representing the store instruction in the load-hit-store table 310. The comparison may be performed by comparison logic. This comparison may also be of values or register operands such as RA and RB that are stored at the source locations. This comparison of step 222 may be referred to as a consultation of first instruction data, namely a consultation of the store instruction data, to determine whether a second instruction, namely the load instruction, has execution data that matches the first instruction data. Comparison logic of the compare field 314 or of the load-hit-store table 310 may be used to perform step 222. Because the decoded information is structured data, in at least some embodiments the comparison may require a one-to-one perfect match of characters of the address fields in order to consider a match to be found. The address field data are examples of execution data which are used to execute the respective instruction.

In the I0-I1-I2 three instruction sequence above, the load instruction I2 may arrive at the comparison point with the execution data of GPR6+GPR7 for the retrieval location and of GPR8 for the loading destination. GPR8 is the register where the load instruction I2 will write the data that is retrieved from the load retrieval location. The load instruction I2 may compare this retrieval location with the saved store instruction information in the load-hit-store table 310 or with the store instruction information from any store instruction that is currently in the compare field 314. The comparison may indicate that the retrieval location GPR6+GPR7 for the load instruction I2 matches the store destination GPR6+GPR7 for the store instruction I1. Thus, the store instruction I1 and the load instruction I2 share a location in the memory that is used by both for execution of the respective instruction. For the store instruction I1, GPR6 is the RA value and GPR7 is the RB value. Thus, the load instruction I2 depends on the store instruction I1 in order for the load instruction I2 to obtain the up-to-date information needed to execute the loading.

In a step 226 of the load instruction flow process 200B of the dependency-reducing processor operation process, for a match, data from the store instruction is copied as skip data into the load instruction. The match refers to the comparison that occurred in step 222. The skip data may include a physical register file location identifier, an instruction tag of the instruction that writes into that location of the physical register file, and a W-bit.

In at least some embodiments, the skip data from the store instruction may be copied into a third source field of the load instruction. This third source field may be referred to as a load-hit-store field that is used for dependency tracking in a load instruction. In at least some embodiments, this field may be an S2 field that is used for dependency tracking in a load instruction and, therefore, is typically empty when the load instruction is in the compare field 314 or is at the load-hit-store table 310 for comparison with entries representing store instructions. This field may typically be used for a store instruction, but, at this stage before step 226, may be empty for a load instruction.

This matching data of the store instruction may direct to a prior instruction, such as the add instruction I0 in the three instruction sequence I0-I1-I2 example, so that execution of the prior instruction provides the respective data. This data produced by the prior instruction may be referred to as prior data. The prior data that is copied into the load instruction may include the instruction tag and the W bit from the store instruction which originally were the itag and the W bit of a prior instruction on which the store instruction depended, in the example above the instruction tag and W bit of the add instruction I0. The physical register file address of the store data may also here be provided to the load instruction. This physical register file address may be the location for holding the store data that the store instruction will write to memory. Due to instruction dependency this store data may also be loaded by the load instruction during execution of the load instruction. This data copied may be referred to as skip data or shortcut data.

Whereas a load instruction traditionally retrieves a value from a memory location and enters this value into a register location, in at least some embodiments the loading instruction modified in step 226 may become a pseudo-load instruction. Because of the use of the skip over the store instruction, the modified load instruction or the pseudo-load instruction may retrieve a value from one or more register locations and load that value into another register location. This retrieval of the data from the register instead of from the memory location may cause the load instruction to be referred to as a pseudo-load instruction.

In the I0-I1-I2 three instruction sequence described above, in step 226 data is copied into the load instruction I2 from the store instruction I1 or from the entry in the load-hit-store table 310 for the store instruction I1. This copied data may be referred to as skip data or shortcut data. The skip data includes the instruction tag of the producer of the "GPR5" data. In this case, the add instruction I0 is the producer of the "GPR5" data. The instruction tag of the add instruction I0 is "I0". A 9-bit field may represent the instruction tag. In one embodiment, the instruction tag for the add instruction I0 may be 0x000. The copied data which is the skip data in this example also includes a tag for the physical register file location. This physical register file tag in this example may be 0x005 as the physical location that corresponds to the logical location "GPR5". The W-bit of a binary "No" from the add instruction I0 that was passed to the store instruction I1 may here also be copied into the load instruction I2. This information from and/or about the add instruction I0 passed into the load instruction I2 may be referred to as skip data or shortcut data.

The bypass mux 312 may be a multiplexer that may select between different streams and forward the selected stream further downstream in a process. The bypass mux 312 may recognize whether a load instruction hits in the compare field 314 against an address field of a store instruction that is not yet written into the load-hit-store table 310 or whether a load instruction has a match result from the load-hit-store table 310. The bypass mux 312 may select one of those two options for forwarding or if a load instruction had no hit may select the load instruction for normal operation with no valid S2 source.

In a step 228 of the load instruction flow process 200B of the dependency-reducing processor operation process, the load instruction with the skip data is written into the issue queue 316. Table 3 below shows an example of a table that may in some embodiments be or be part of the issue queue 316. Table 3 includes columns for the updated information that was received by the load instruction in step 226. In Table 3, the second, third, and fourth columns to the right are for the updated information S2_ITAG, S2_W, and S2_PFR tag, respectively, that were retrieved from the store instruction on which this load instruction depends. The updated information that came from the store instruction points to the prior instruction data, because the store instruction depended on the prior instruction. This updated information that is recorded may be referred to as shortcut information or skipping information. The first column (left-most column) may in general represent all other fields for the load instruction.

TABLE 3

| Issue Queue 316 | | | |
| --- | --- | --- | --- |
| Load Instruction Other Fields | S2_ITAG | S2_W | S2_PFR_tag |

In the I0-I1-I2 three instruction sequence described above, in step 228 the instruction tag that was assigned to the add instruction I0 is copied into the ITAG column. In this example, the tag "I0" may be written into the ITAG column. In another embodiment, "0x000" may be written into the ITAG column as the instruction tag for the add instruction I0. The W-bit of a binary "No" may be copied into the W bit column. The physical register file tag or location that was assigned for writing of the GPR5 data by the add instruction I0 may be loaded into the S2_PFR tag. As explained above with respect to step 226, "0x005" may be the physical register file tag that is written in this example into the S2_PFR tag column.

In a step 230 of the load instruction flow process 200B of the dependency-reducing processor operation process, the updated load instruction is issued from the issue queue 316. The W bits may indicate whether needed data has been written and is available for use in the loading to be carried out as the purpose of the loading instruction. The W bits may include W bits from the S2 column which are from the updated information from the store instruction (and from the prior instruction) on which the load instruction depends. The W bits may also include any W bits from information that was initially part of the load instruction. If all information and sources for the load instruction are ready, the issue queue 316 may issue, according to a sequential order of receiving the instructions (first-come, first-serve basis), the load instruction for execution of the load instruction. The issuing from the issue queue 316 may constitute a waking of the instruction.

After or upon completion or execution of the prior instruction, both the first instruction and the second instruction, e.g., the load instruction I2 described here and the store instruction I1 described with respect to FIG. 2A, may be woken for execution, without requiring execution of the first instruction before waking of the second instruction. In the above-described three-instruction sequence I0-I1-I2, after or upon execution of the add instruction I0, both the store instruction I1 and the load instruction I2 may be woken for execution, without requiring execution of the store instruction I1 before waking of the load instruction I2. After receiving an availability indication of the prior data, both the first instruction and the second instruction may be woken for execution, without requiring execution of the first instruction before waking of the second instruction. The issue queue 316 may receive this availability indication. This availability indication may be generated when the value determined by addition of GPR10+GPR11 has been entered into the GPR5 register in the physical register file 318.

The updated load instruction that is issued in step 230 may include the physical register file tag received in step 226 and that was found in a matching store instruction in the load-hit-store table 310. The updated load instruction that issues from the issue queue in step 230 may also include normal register fields, e.g., normal RA/RB fields, that will be used for address generation, e.g., by the AGEN 326. These normal RA/RB fields for the load instruction I2 may be the physical register file tags, e.g., pointers, assigned to GPR6 and GPR7. For example, the physical register file tag or pointer assigned to GPR6 may be 0x006. The physical register file tag or pointer assigned to GPR7 may be 0x007.

For the dependency-reducing processor core 32 shown in FIG. 3, the flow path arrows that are shown past the issue queue 316 are for the load instruction.

In a step 232 of the load instruction flow process 200B of the dependency-reducing processor operation process, the data to be loaded for the load instruction is determined by using the skip data. This skip data or shortcut data may be that data that was copied into the load instruction in step 226.

The S2 slot in the load instruction was an empty field that was filled in step 226 with the skip data from the shortcut around the store instruction on which the load instruction depends. The use of the empty field with the bypass to the earlier instruction may be said to perform a shortcut or a skip around the intermediate store instruction to facilitate directly accessing the desired information. The load instruction I2 may use the skip data from the add instruction I0 to determine the data to be loaded for the load instruction. The load instruction I2 may check the physical register file 318 at the physical location corresponding to the logical location GPR5, e.g., at the physical location with the tag 0x005. The result of the add instruction I0 was stored at that physical location 0x005. The load instruction I2 may copy the information at the 0x005 location in the physical register file 318 to produce the S2 324 data shown in FIG. 3. Performing this data determination of step 232 may include copying the data from the 0x005 location in the physical register file 318 into a field of a transmittable element that may be transmitted to the store forwarding mux 332. The S2 324 data shown in FIG. 3 is read out of the physical register file 318 as part of performing step 232. In the above-described three-instruction sequence with I0-I1-I2, for the load instruction I2 the GPR5 data found at the 0x005 location may be the S2 324 data.

As a part of step 232, the S2 324 data may be sent to a store forwarding mux and to a load result mux via a bypass around a store reorder queue. In the dependency-reducing processor core 32 shown in FIG. 3, a load result mux 334, a store forwarding mux 332, and a store reorder queue 330 are shown. A bypass 331 around the store reorder queue 330 is also shown in FIG. 3. The store reorder queue 330 may also include or be referred to as a component of an out-of-order processor. The store reorder queue 330 controls the store instructions that are performed so that the store instructions exit in program order for coherency reasons. As store instructions are sometimes presented out of order, the store reorder queue 330 helps bring the exit order of the store instructions back into the program order. As the load instruction may now be said to depend directly on the further previous instruction, e.g., on the add instruction, via the shortcut, instead of on the first previous instruction, the load instruction has no need to wait for the store instruction to be finished or to be issued before the load instruction may proceed. Thus, this shortcut information, e.g., S2 324, may bypass the store reorder queue 330. The store reorder queue 330 may not yet hold the store data.

The store forwarding mux 332 may include a multiplexer and may select between different streams and may forward a selected stream. The store forwarding mux 332 is shown in FIG. 3; in some embodiments, however, the shortcut information, e.g., S2 324, may bypass the store forwarding mux 332 and may be sent directly to the load result mux 334. The store forwarding mux 332 may mux out the S2 324 data that was read from the physical register file 318 instead of from the store reorder queue 330 to provide to the load result mux 334. The store forwarding mux 332 may select the S2 value if the S2 value is valid; if, however, the S2 value is not valid the store forwarding mux 332 may select the youngest entry in the store reorder queue 330 which is older than the load instruction and against which the load instruction hits.

The initial retrieval location information may also be read by the load instruction from the physical register file 318. This read information may then be transmitted to the AGEN 326. The AGEN 326 is an address generator that may perform a mathematical operation to generate an address or that may receive a value to enter as an address. A value may be received in a load immediate instruction situation. The operation of an address generator such as the AGEN 326 is architecture dependent.

In the I0-I1-I2 three instruction sequence example, the load instruction I2 has as initial retrieval location data the physical locations 0x006 and 0x007 corresponding to "GPR6" and "GPR7", respectively. The load instruction I2 may read the physical register file 318 at these two locations 0x006 and 0x007 to obtain the values from both places and to generate the RA 320 and the RB 322 to input these values into the AGEN 326. The AGEN 326 may use a combination of RA+RB, RA+immediate field, or RB+immediate field data to generate an address. The AGEN 326 may use a combination of two of the RA, RB, and immediate field to generate the address. In this specific example, the store instruction I1 has not yet updated the address pointed to by this AGEN 326, so the data at this address/memory location is not yet valid.

The output of the AGEN 326 may then be passed into a data cache. The AGEN 326 may perform a mathematical operation to generate the address or may receive a value to enter as the address if no mathematical operation is required. For the latter when no mathematical operation is required, a data value retrieved or read in an earlier step may be entered for the generated address. FIG. 3 shows a data cache 328 which may receive the generated address from the AGEN 326. The data cache 328 may include or be a memory. The data cache 328 may input into the load result mux 334 this value which represents what has been committed to memory up to this point. This value may not yet contain store data which has not yet written to memory.

As a part of step 232, the load result mux 334 may select from different determined data that was fed into the load result mux 334. The load result mux 334 may then forward the selection further on to be used for execution of the loading instruction I2. The load result mux 334 may include a multiplexer that includes a combinational logic circuit that acts as a switcher for choosing between multiple inputs, namely choosing which will be output to a single common output line. Thus, in this example the load result mux 334 may select out the load instruction I2 with the S2 324 data that was retrieved from the physical register file 318 and have the load instruction I2 load this S2 324 data into the physical location corresponding to GPR8 in the physical register file 318 as the loading destination, e.g., into the location in the physical register file 318 with the tag 0x008. This S2 324 data was obtained by using the shortcut or skipping data. The information from the data cache 328 may include the data which has previously been stored to the memory location indicated by the AGEN 326. Because the store instruction has not yet been executed, the data from the data cache 328 alone without the store-dependent read information is not the correct data to return to the load instruction. The load result mux 334 will not select out the alternative loading data that came through the AGEN 326 and the data cache 328, because this alternative loading data represents outdated information. The load result mux 334 may mux between the output of the data cache 328 and the output of the store forwarding mux 332. The store forwarding mux 332 may mux between the output of the store reorder queue 330 and the S2 324 value that is read from the physical register file 318.

The load result mux 334 may select the output of the data cache 328 for forwarding if the result of the AGEN 326 from the issued load instruction does not hit any entry in the store reorder queue 330 and if the S2 value from the issuing of the load instruction is not valid, for example, due to no hit in the load-hit-store table 310 or in the compare field 314/bypass mux 312. The output of the store forwarding mux 332 is selected for any hit in the store reorder queue 330 or if the S2 value from the load instruction is valid. For a case where the output of the data cache 328 is selected by the load result mux 334 but there is no hit in the data cache 328, then the load instruction will be marked as a miss and data will be pulled from lower level cache or main memory.

The AGEN 326, the data cache 328, the store reorder queue 330, the store forwarding mux 332, and the load results mux 334 may together constitute a load store unit (LSU). In the shown embodiment, the LSU does not include the physical register file 318. Other embodiments may include some physical register file as part of the LSU. The LSU may read the physical register file 318 and receive data. A pointer to the physical register file 318 may be provided by the issue queue 316 to the LSU at issue time. This pointer may have been provided to the issue queue 316 by the mapper 308 at dispatch time for the destination of the load of the load instruction I2. The LSU will indicate that the data is being written and is now valid. This indication will set W-bits in the issue queue 316, the mapper 308, and the load-hit-store table 310 for the register that is being written. This indication to the issue queue 316 may wake up other steps for execution once prior steps on which these later steps depend have finished.

In a step 234 of the load instruction flow process 200B of the dependency-reducing processor operation process, the selected data is sent to the younger dependent instruction. The selected data may refer to the S2 324 data that was selected by the load result mux 334 and which contained the data from the physical location corresponding to GPR5 which was part of the skip data for the load instruction I2. If any other instruction depended on the load instruction I2, e.g., needed data from the 0x008 location corresponding to GPR8, then this other instruction would need the information in the loading instruction I2 before the other younger instruction could proceed to obtain updated data. This sending to any younger dependent instruction in step 234 may occur via the younger dependent instruction bypass 336 that is shown in FIG. 3. This pass to a younger dependent instruction may allow that younger dependent instruction to proceed before the load instruction I2 has completed loading data to the physical register file 318. Thus, this pass of step 234 may also reduce dependency delays in the processing.

In a step 236 of the load instruction flow process 200B of the dependency-reducing processor operation process, the determined data is sent to the loading destination and is there loaded. The loading destination may be a location in the physical register file 318. This sending in step 236 may occur via the load instruction write route 338 that is shown in FIG. 3.

In the I0-I1-I2 three instruction sequence example described above, the step 236 may include taking the S2 324 value and loading the S2 324 value into the 0x008 location in the physical register file 318 that corresponds to GPR8. The 0x008 location in the physical register file may be the loading destination for the load instruction I2. The S2 324 value may have come from the 0x005 location corresponding to GPR5, with the 0x005 location being considered skipping data. For the loading, the S2 324 value may be written at a write port of the physical register file 318 that sends the S2 324 value into the 0x008 location within the physical register file 318. When the load data is ready to be used, the load instruction will write to the location that the mapper 308 assigned for this load instruction. The load instruction may use prior data from a prior instruction for the loading. For example, the load instruction may use the add instruction I0 data, by loading the value from the 0x005 location into the 0x008 location.

A sequence of performance of steps 234 and 236 may depend on a cycle in which the instruction was issued.

The load instruction may then finish as usual. The store instruction may finish as usual as was described with respect to the store instruction flow process 200A. If the store instruction causes an exception later on, then the dependent load and any subsequent younger instructions may be flushed out. For example, if a store instruction is trying to write to an area of memory for which the store instruction has not been granted access, then an exception would be generated.

The store instruction flow process 200A and the load instruction flow process 200B of the dependency-reducing processor operation process may be repeated for other store instructions and load instructions in the code that is being executed by the dependency-reducing processor core 32. The dependency-reducing processor operation process may continue until no more instructions are available to fetch and/or to evaluate from the software code.

The dependency-reducing processor core 32 may be designed with traditional load-hit-store table capabilities that rely on stalling as well as the dependency-reducing features described herein, with the so-built processor able to be switched between the two embodiments or to use both embodiments. The load-hit-store table 310 is intended to avoid or reduce flushing. Flushing happens when data is loaded and later stored to the same address where the store is older, so that a detection is made that the load had stale data. The flush occurs to remove the stale data. The load-hit-store table is put in place to generate a dependency on the store instruction to delay issuing of the load instruction until the store instruction has been issued. The dependency-reducing features described herein allow this dependency to be to the prior instruction instead of the store to allow the load instruction to issue earlier.

The dependency-reducing processor core 32 and the store instruction flow process 200A and the load instruction flow process 200B working together are prophetic examples.

It may be appreciated that FIGS. 2A-2B and 3 provide only illustrations of some embodiments and do not imply any limitations with regard to how different embodiments may be implemented. Many modifications to the depicted embodiment(s), e.g., to a depicted sequence of steps or arrangement of processor components, may be made based on design and implementation requirements.

Figure 4:
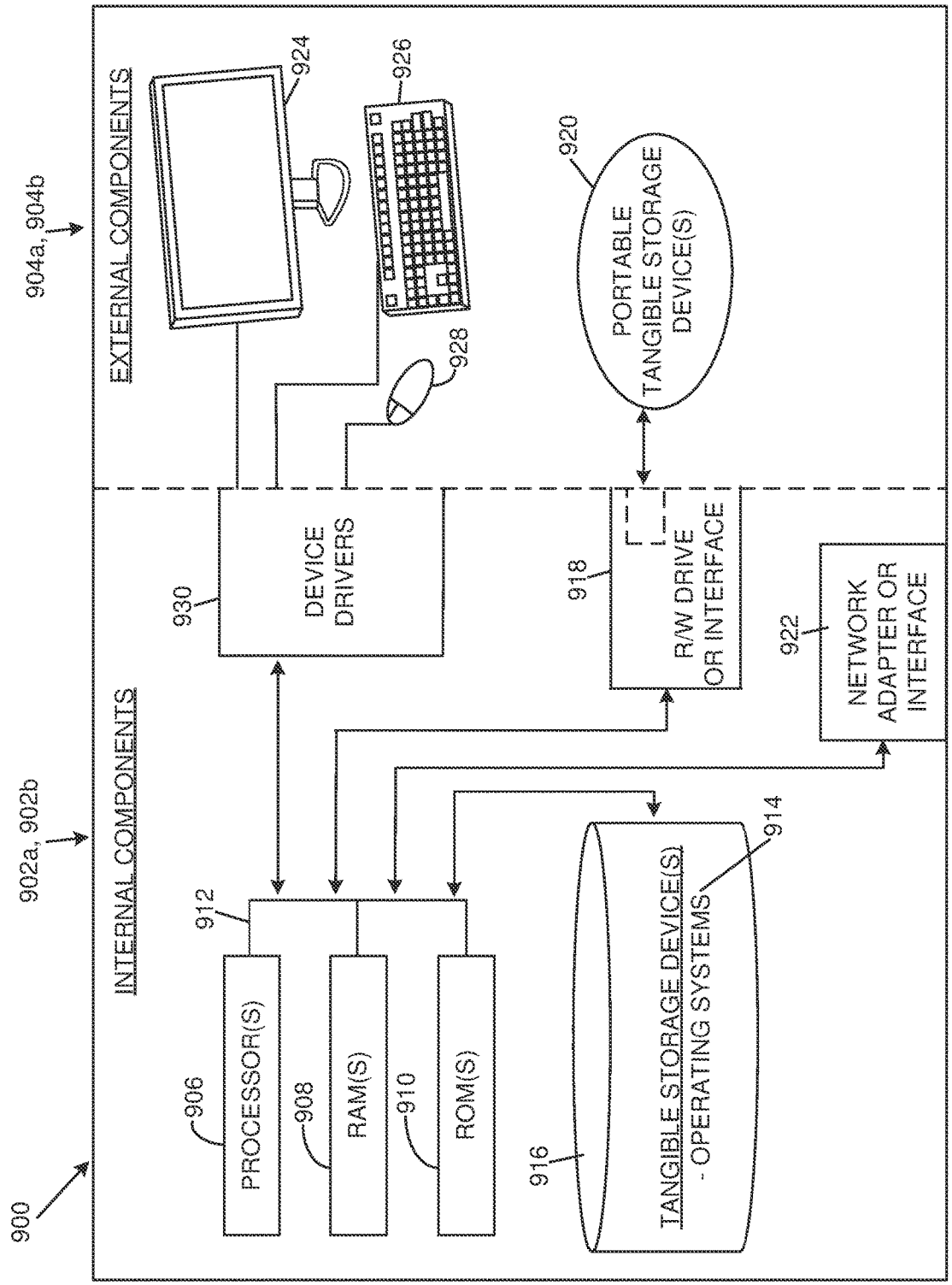
FIG. 4 is a block diagram of internal and external components of a computer system according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more processors 906 may be a dependency-reducing processor core 32. The one or more operating systems 914 may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. Software for being executed or ran by the one or more processors 906 may be downloaded from an external computer (e.g., server) via a network (for example, the Internet, a local area network or other, wide area network) and respective network adapters or interfaces 922. From the network adapters (or switch port adaptors) or interfaces 922, such software programs may be loaded into the respective hard drive 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operation of a processor core, the method comprising:
   consulting first instruction data to determine whether a second instruction has execution data that matches the first instruction data, wherein the first instruction data is from a first instruction;
   in response to determining that the second instruction has execution data that matches the first instruction data, copying, from the first instruction, a data location into the second instruction, wherein the first instruction depends on data that is to be stored at the data location;
   after receiving an availability indication that the data is at the data location, issuing both the first instruction and the second instruction for execution, without requiring issuing of the first instruction before issuing the second instruction; and
   executing the second instruction by using the data location to obtain the data and so as to skip the first instruction.

2. The method of claim 1, wherein the consulting occurs in at least one member selected from a group consisting of a load-hit-store table and a bypass around a load-hit-store table.

3. The method of claim 1, wherein the first instruction comprises a store instruction;
   wherein the second instruction comprises a load instruction; and
   wherein the store instruction is executed by storing the data in a memory address.

4. The method of claim 1, wherein the data is generated from a prior instruction; and
   wherein completion of the prior instruction generates the availability indication of the data that causes the first instruction and the second instruction to issue.

5. The method of claim 1, wherein the executing the second instruction comprises:
   retrieving data in a physical register file corresponding to the data location; and
   sending the retrieved data to a mux via bypassing a store reorder queue.

6. The method of claim 1, wherein the copying of the data location into the second instruction occurs into a field for dependency tracking.

7. The method of claim 1, further comprising:
   in further response to determining that the second instruction has execution data that matches the first instruction data, copying, from the first instruction, at least one member selected from the group consisting of an instruction tag and a data-availability written bit into the second instruction.

8. The method of claim 1, wherein the first instruction is a store instruction; and wherein the method further comprises writing an instruction tag of a producing instruction into a load-hit-store table, wherein the store instruction depends on the producing instruction.

9. The method of claim 8, further comprising writing a first physical register file tag into the load-hit-store table, wherein the first physical register file tag represents a first register file location in a physical register file, and wherein execution of the producing instruction places data into the first register file location.

10. The method of claim 8, wherein the second instruction is a load instruction;
wherein the instruction tag of the producing instruction is also copied from the second instruction into the first instruction; and
wherein the copying of the data location and the instruction tag into the second instruction comprises the load instruction reading out producing instruction information from the load-hit-store table.

11. The method of claim 10, wherein the copying the data location into the second instruction comprises the load instruction reading out a first physical register file tag from the load-hit-store table, wherein the first physical register file tag represents a first register location in a physical register file, and wherein execution of the producing instruction places the data into the first register file location.

12. The method of claim 11, wherein the executing the second instruction further comprises reading a value from the first register location.

13. The method of claim 12, wherein the executing the second instruction further comprises loading the read value into a second register in the physical register file.

14. The method of claim 12, further comprising forwarding the read value to a store forwarding mux and to a load result mux.

15. A computer system comprising one or more processors and one or more computer-readable memories, wherein a first processor of the one or more processors comprises a processor core configured to perform a method comprising:
consulting first instruction data to determine whether a second instruction has execution data that matches the first instruction data, wherein the first instruction data is from a first instruction;
in response to determining that the second instruction has execution data that matches the first instruction data, copying, from the first instruction, a data location into the second instruction, wherein the first instruction depends on data that is to be stored at the data location;
after receiving an availability indication that the data is at the data location, issuing both the first instruction and the second instruction for execution, without requiring issuing of the first instruction before issuing of the second instruction; and
executing the second instruction by using the data location to obtain the data and so as to skip the first instruction.

16. The computer system of claim 15, wherein the first instruction comprises a store instruction;
wherein the second instruction comprises a load instruction; and
wherein the matching data relates to a memory address referred to by both the store instruction and the load instruction.

17. The computer system of claim 15, wherein the first instruction is a store instruction; and
wherein the method further comprises writing an instruction tag of a producing instruction into a load-hit-store table, wherein the store instruction depends on the producing instruction.

18. A processor core comprising one or more hardware facilities comprising:
at least one execution unit for executing instructions comprising a first instruction, a second instruction, and a prior instruction; and
a physical register file;
wherein the processor core is capable of performing a method comprising:
consulting first instruction data to determine whether the second instruction has execution data that matches the first instruction data, wherein the first instruction data is from the first instruction;
in response to determining that the second instruction has execution data that matches the first instruction data, copying, from the first instruction, a data location into the second instruction, wherein the first instruction depends on data to be stored at the data location;
after receiving an availability indication that the data is at the data location, issuing both the first instruction and the second instruction for execution, without requiring issuing of the first instruction before issuing of the second instruction; and
executing the second instruction by using the data location to obtain the data and so as to skip the first instruction and by using the at least one execution unit;
wherein the executing the second instruction comprises using the physical register file.

19. The processor core of claim 18, wherein the first instruction comprises a store instruction;
wherein the second instruction comprises a load instruction; and
wherein the store instruction is executed by storing the data in a memory address.

20. The processor core of claim 18, wherein the first instruction is a store instruction; and
wherein the method further comprises writing an instruction tag of a producing instruction into a load-hit-store table, wherein the store instruction depends on the producing instruction.

* * * * *